(12) United States Patent
Li

(10) Patent No.: US 12,440,965 B2
(45) Date of Patent: Oct. 14, 2025

(54) ROBOT SERVO MOTOR

(71) Applicant: Jiangxi Jizhun Technology Co., Ltd., Ganzhou (CN)

(72) Inventor: Wei Li, Ganzhou (CN)

(73) Assignee: Jiangxi Jizhun Technology Co., Ltd., Ganzhou (CN)

( * ) Notice: Subject to any disclaimer, the term of this patent is extended or adjusted under 35 U.S.C. 154(b) by 202 days.

(21) Appl. No.: 18/451,135

(22) Filed: Aug. 17, 2023

(65) Prior Publication Data

US 2024/0157546 A1 May 16, 2024

(51) Int. Cl.
*B25J 9/12* (2006.01)
*F16H 1/28* (2006.01)

(52) U.S. Cl.
CPC . *B25J 9/12* (2013.01); *F16H 1/28* (2013.01)

(58) Field of Classification Search
CPC .... B25J 9/12; B25J 9/102; B25J 9/126; F16H 1/28; H02K 7/116; H02K 11/21; H02K 11/30
See application file for complete search history.

(56) References Cited

U.S. PATENT DOCUMENTS

2009/0066198 A1* 3/2009 Pettey .................... A63H 17/26
310/75 D

FOREIGN PATENT DOCUMENTS

| CN | 101201096 | A | * | 6/2008 | |
|---|---|---|---|---|---|
| CN | 206344145 | U | | 7/2017 | |
| CN | 109834727 | A | | 6/2019 | |
| CN | 218699005 | U | | 3/2023 | |
| EP | 4142117 | A1 | * | 3/2023 | ............. H02K 11/21 |

OTHER PUBLICATIONS

CN-101201096-A_translate (Year: 2008).*

* cited by examiner

*Primary Examiner* — Tulsidas C Patel
*Assistant Examiner* — Mohammed Ahmed Qureshi
(74) *Attorney, Agent, or Firm* — Nitin Kaushik

(57) ABSTRACT

The present invention discloses a robot servo motor, comprising a positioner, a connecting screw, mounting bolts, a polygonal connecting groove, a blank-off plate, a connecting wire, a connecting tube, an energized wire, a base, a first fastening bolt, a circuit board, a motor, a multi-layer planetary transmission, a second fastening bolt, a protection plate, a third fastening bolt, a rotating disc and an output shaft; wherein the output shaft is fixedly engaged with the rotating disc via the connecting screw, and the rotating disc is threadedly engaged with the third fastening bolt, while the output shaft is fixedly engaged on the output end of the multi-layer planetary transmission; the top end of the multi-layer planetary transmission is fixedly engaged with the blank-off plate via mounting bolts.

7 Claims, 6 Drawing Sheets

ROBOT SERVO MOTOR

CROSS-REFERENCE TO RELATED APPLICATIONS

The application claims priority to Chinese patent application No. 202222997203. 5, filed on Nov. 11, 2022, the entire contents of which are incorporated herein by reference.

TECHNICAL FIELD

The present invention relates to the field of industrial technology, specifically a robot servo motor.

BACKGROUND

Industrial robots are multi joint manipulators or multi-degree-of-freedom mechanical devices widely applied in the industrial field, which have a certain degree of automation and can realize various industrial processing and manufacturing functions by virtue of their own power sources and control abilities. Industrial robots are widely applied in various industrial fields, such as electronics, logistics, and chemical industry. In the process of using industrial robots, robot servo motor is crucial. The existing robot servo motors typically consist of a motor and a planetary transmission in the assembly process, and cannot meet the current demands as they fail to get precise rotation angles when working. Therefore, it is crucial to design a robot servo motor.

SUMMARY

The object of the present invention is to provide a robot servo motor thereby solving the problem as raised in the above-mentioned background.

For the above-mentioned purpose, the present invention provides the following technical solution: a robot servo motor, comprising a positioner, a connecting screw, mounting bolts, a polygonal connecting groove, a blank-off plate, a connecting wire, a connecting tube, an energized wire, a base, a first fastening bolt, a circuit board, a motor, a multi-layer planetary transmission, a second fastening bolt, a protection plate, a third fastening bolt, a rotating disc and an output shaft; wherein said output shaft is fixedly engaged with the rotating disc via the connecting screw, and the rotating disc is threadedly engaged with the third fastening bolt, while the output shaft is fixedly engaged on the output end of the multi-layer planetary transmission; the top end of the multi-layer planetary transmission is fixedly engaged with the blank-off plate via the mounting bolts; the top face of the blank-off plate is configured with the polygonal connecting groove at the center, and the polygonal connecting groove is mounted with the positioner in the interior, the positioning end of which is configured on the output shaft in a polygon limiting mode; the top face of the blank-off plate is fixedly engaged with the protection plate via the second fastening bolt, and the protection plate is positioned directly above the positioner.

Preferably, said positioner is configured with a plug-in terminal, and the plug-in terminal is matedly engaged with one end of the connecting wire.

Preferably, the input shaft of said multi-layer planetary transmission is fixedly engaged with the output end of the motor, and the motor is fixedly engaged in the interior of the top end of the connecting tube.

Preferably, the top end of said connecting tube is configured with the multi-layer planetary transmission.

Preferably, the bottom end of said connecting tube is fixedly engaged with the base via the first fastening bolt, and the interior of the base is configured with the circuit board.

Preferably, said circuit board is matedly engaged with the other end of the connecting wire and one of the energized wire in the meanwhile.

Preferably, said circuit board is positioned between the base and the motor.

Compared with the prior art, the beneficial effect of the present invention is: by configuring a positioner on the output end in a polygon limiting mode, when an output shaft is coupled with the work of a circuit board and a positioner during rotation, the invention could get precise output rotation angles of a robot servo motor and meet the current demands for robot servo motors, thereby improving practicability and novelty of the robot servo motor.

Figure 1:
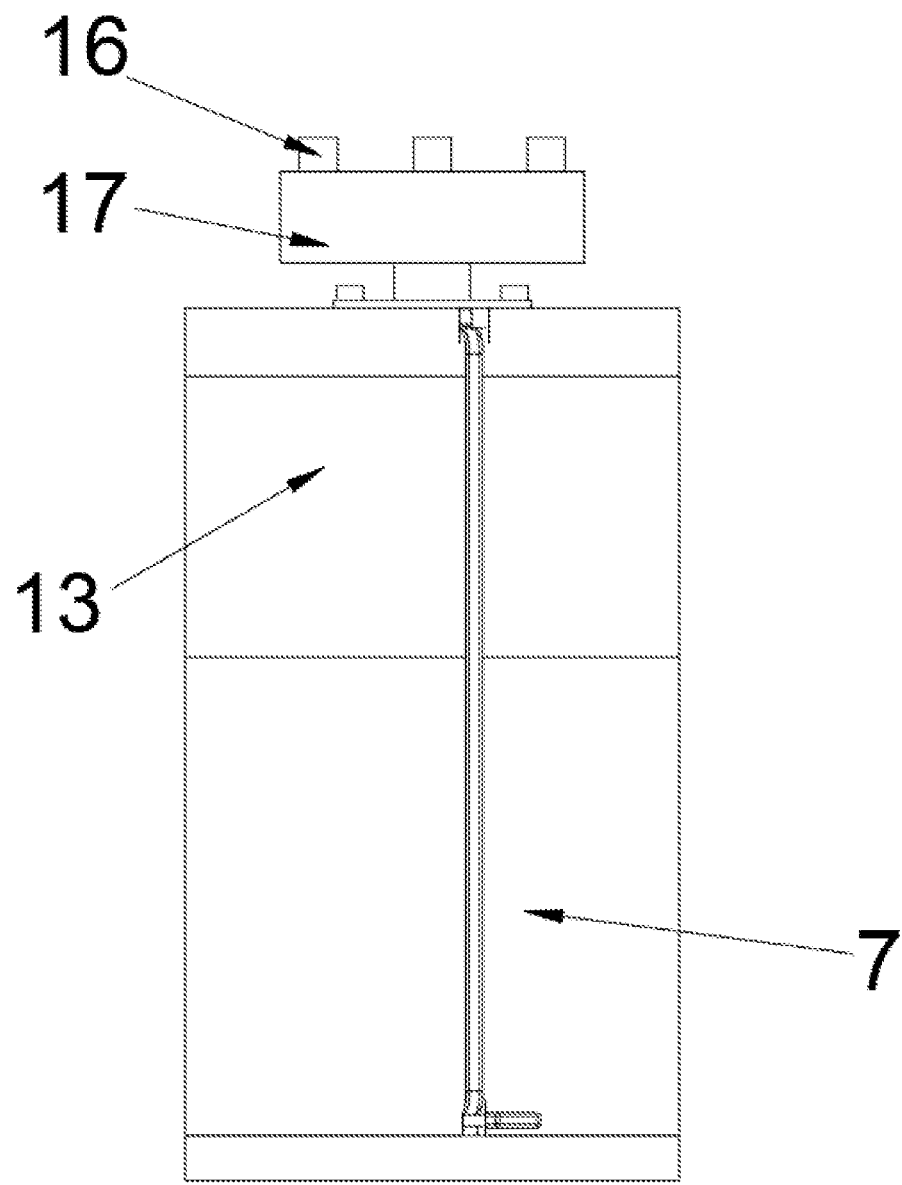
FIG. 1 is a front view of the overall structure of the present invention.

In the drawings: 1. positioner; 2. connecting screw; 3. mounting bolts; 4. polygonal connecting groove; 5. blank-off plate; 6. connecting wire; 7. connecting tube; 8. energized wire; 9. base; 10. first fastening bolt; 11. circuit board; 12. motor; 13. multi-layer planetary transmission; 14. second fastening bolt; 15. protection plate; 16. third fastening bolt; 17. rotating disc; 18. output shaft.

DETAILED DESCRIPTION OF THE EMBODIMENTS

The following clearly and completely describes the technical solution in the example of the present invention with reference to the accompanying drawings in the example of the present invention. Apparently, the described example is a part rather than all of the embodiments of the present invention. All other examples obtained by a person of ordinary skill in the art based on the example of the present invention without inventive efforts shall fall within the protection scope of the present invention.

Figure 2:
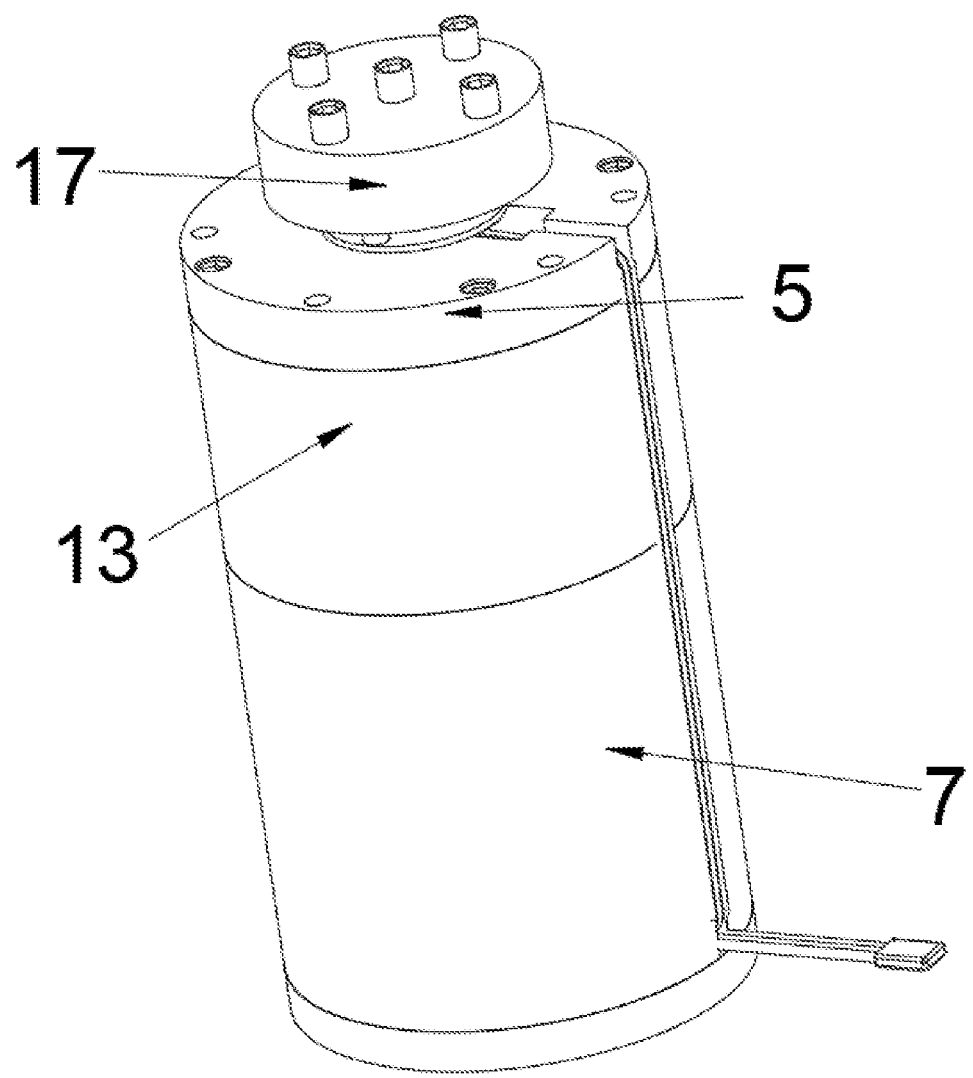
FIG. 2 is an isometric view of the overall structure of the present invention.
Figure 3:
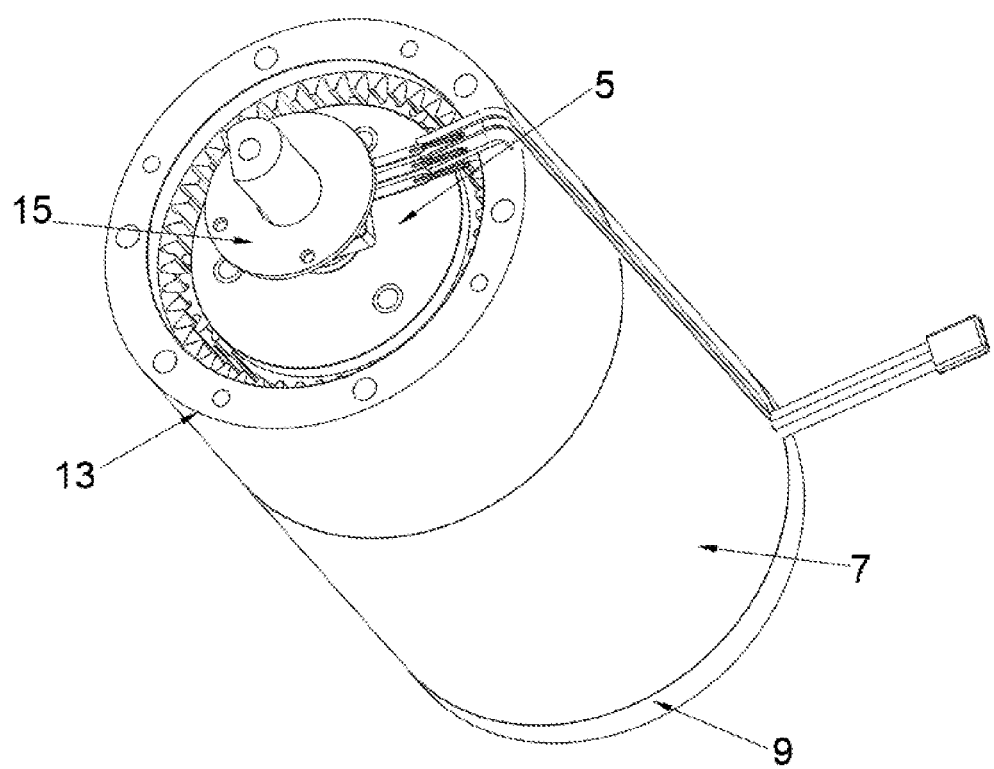
FIG. 3-FIG. 5 are all isometric views of local structures of the present invention.
Figure 4:
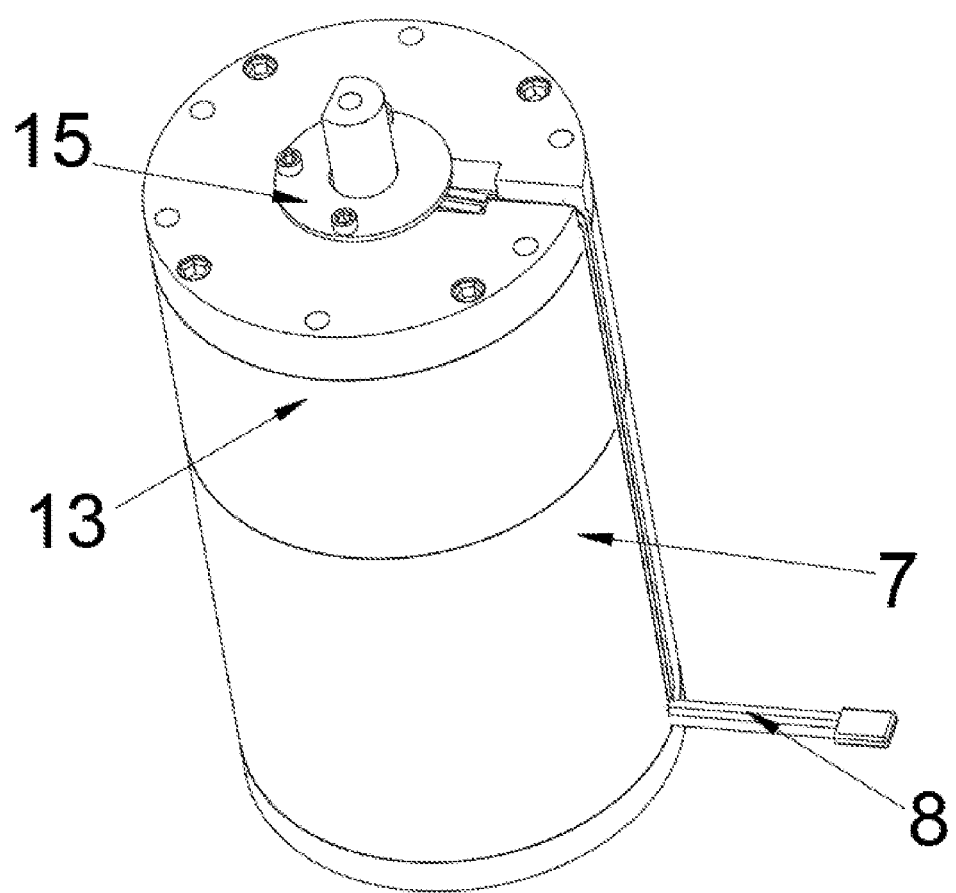
Figure 5:
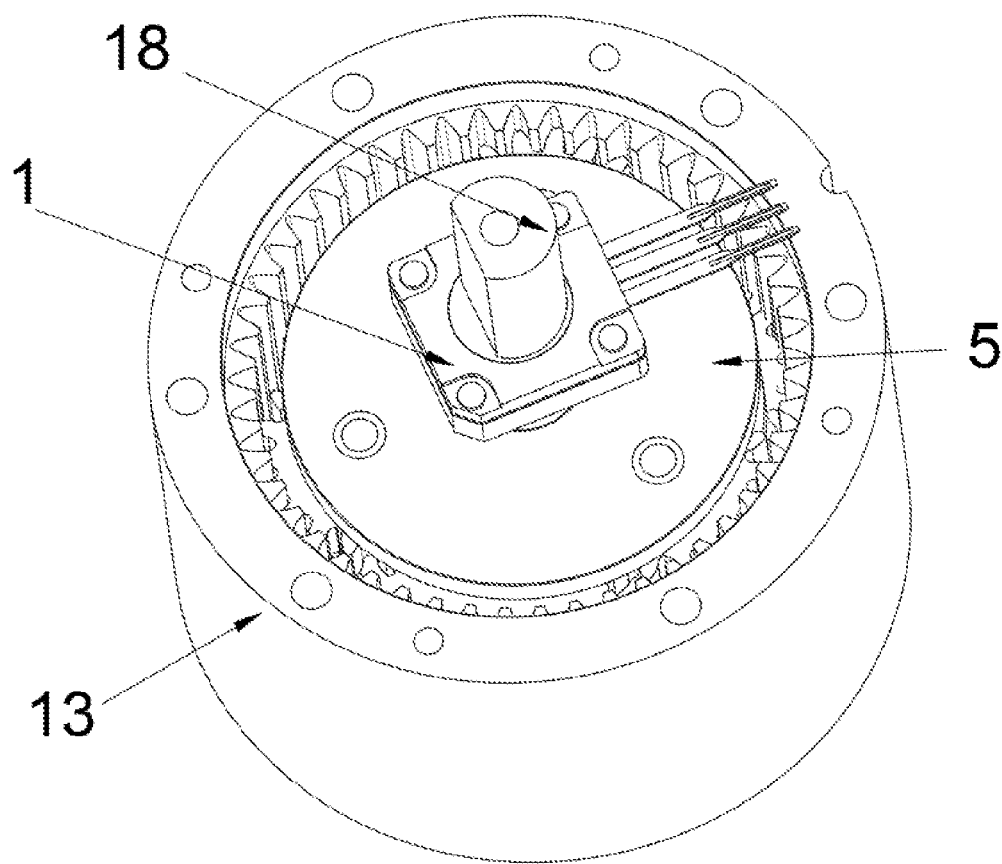
Figure 6:
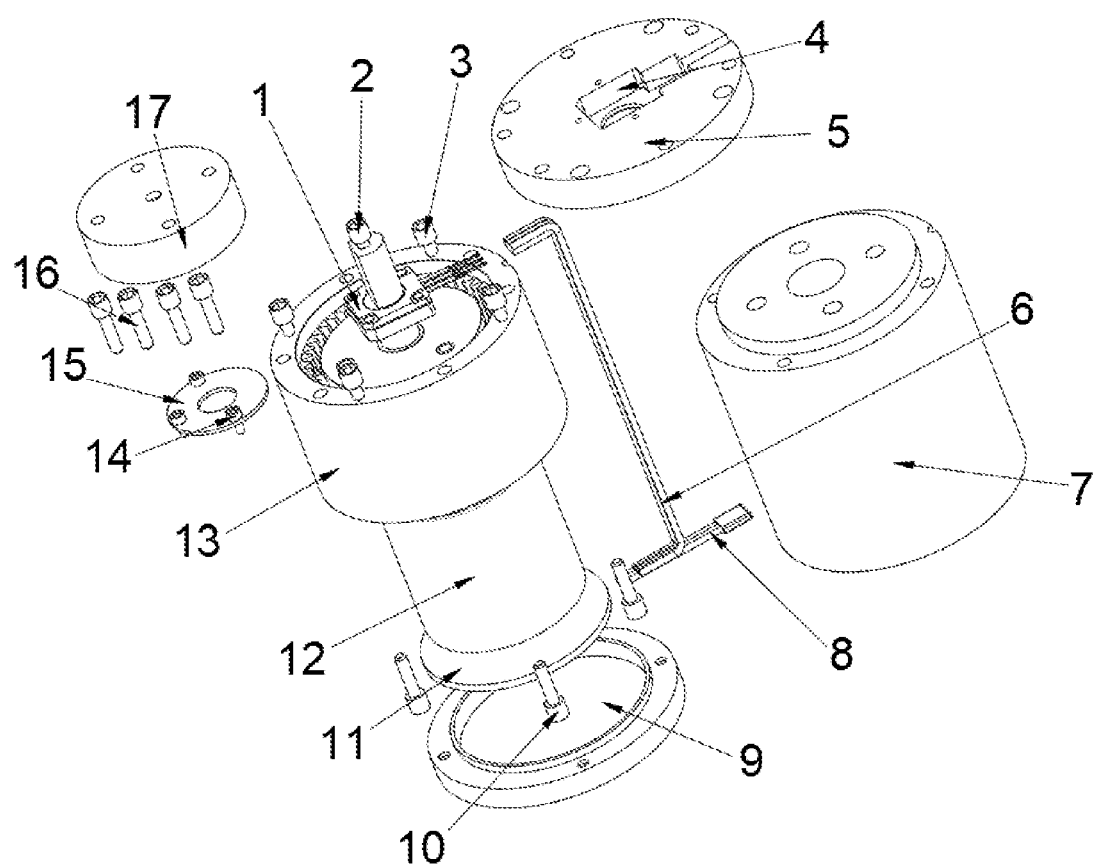
FIG. 6 is an exploded view of the overall structure of the present invention.

Referring to FIG. 1-FIG. 6, the present invention provides an example: a robot servo motor, comprising a positioner 1, a connecting screw 2, mounting bolts 3, a polygonal connecting groove 4, a blank-off plate 5, a connecting wire 6, a connecting tube 7, an energized wire 8, a base 9, a first fastening bolt 10, a circuit board 11, a motor 12, a multi-layer planetary transmission 13, a second fastening bolt 14, a protection plate 15, a third fastening bolt 16, a rotating disc 17 and an output shaft 18; wherein the output shaft 18 is fixedly engaged with the rotating disc 17 via the connecting screw 2, and the rotating disc 17 is threadedly engaged with the third fastening bolt 16, while the output shaft 18 is fixedly engaged on the output end of the multi-layer planetary transmission 13; the top end of the multi-layer planetary transmission 13 is fixedly engaged with the blank-off plate 5 via mounting bolts 3; the top face of the blank-off plate 5 is configured with the polygonal connecting groove 4 at the center, and the polygonal connecting groove 4 is mounted with the positioner 1 in the interior, while the positioning end of the position 1 is configured on the output shaft 18 in a polygon limiting mode; the top face of the blank-off plate 5 is fixedly engaged with the protection plate 15 via the second fastening bolt 14, and the protection plate 15 is positioned directly above the positioner 1; the positioner 1 is configured with a plug-in terminal, and the plug-in terminal is engaged with one end of the connecting wire 6; the plug-in terminal is configured to electrically engage with the positioner 1, thereby facilitating the circuit connection; the input shaft of said multi-layer planetary transmission 13 is fixedly engaged with the output end of the motor 12, and the motor 12 is fixedly engaged in the interior of the top end of the connecting tube 7; the top end of said connecting tube 7 is configured with the multi-layer planetary transmission 13; the bottom end of the connecting tube 7 is fixedly engaged with the base 9 via the first fastening bolt 10, and the interior of the base 9 is configured with the circuit board 11; the circuit board 11 is engaged with the other end of the connecting wire 6 and one of the energized wire 8 in the meanwhile, and the circuit board 11 is positioned between the base 9 and the motor 12. By placing the circuit board 11 between the base 9 and the motor 12, while the motor 12 is electrically engaged with the circuit board 11, the circuit board 11 is concealed, which is beneficial to protect the circuit board 11.

Working principle: When the device is used, firstly, the device is electrically engaged the the power supply through the configured energized wire 8, so as to complete the electrical conductivity work of the device. During the working process, the motor 12 itself and its coupling with the multi-layer planetary transmission 13 drive the rotation of the output shaft 18. Moreover, during the working process, the output shaft 18 is coupled with the positioner 1 to collect the angles of rotation, and the collected data is transmitted to the circuit board 11. More precise angles of rotation would be acquired by controlling the working rotation angle of the motor 12 using the circuit board 11, which improves the practicability of the device.

It will be apparent to those skilled in the art that the present invention is not limited to the details of the above-described illustrative example, and that the present invention can be embodied in other specific forms without departing from the spirit or essential characteristics of the present invention. Accordingly, from whichever standpoint the example should be regarded in an illustrative rather than a restrictive sense, and the scope of the present invention is defined by the appended claims instead of the foregoing description. As such, the present invention is intended to embrace all such variations that fall within the meaning and scope of the equivalent requirements of the claims. Any reference sign in a claim shall not be construed as limiting the claim concerned.

What is claimed is:

1. A robot servo motor, comprising a positioner (1), a connecting screw (2), mounting bolts (3), a polygonal connecting groove (4), a blank-off plate (5), a connecting wire (6), a connecting tube (7), an energized wire (8), a base (9), a first fastening bolt (10), a circuit board (11), a motor (12), a multi-layer planetary transmission (13), a second fastening bolt (14), a protection plate (15), a third fastening bolt (16), a rotating disc (17) and an output shaft (18); characterized in that said output shaft (18) is fixedly engaged with the rotating disc (17) via the connecting screw (2), and the rotating disc (17) is threadedly engaged with the third fastening bolt (16), while the output shaft (18) is fixedly engaged on the output end of the multi-layer planetary transmission (13); the top end of the multi-layer planetary transmission (13) is fixedly engaged with the blank-off plate (5) via mounting bolts (3); the top face of the blank-off plate (5) is configured with the polygonal connecting groove (4) at the center, and the polygonal connecting groove (4) is mounted with the positioner (1) in the interior; the positioning end of the position (1) is configured on the output shaft (18) in a polygon limiting mode; the top face of the blank-off plate (5) is fixedly engaged with the protection plate (15) via the second fastening bolt (14), and the protection plate (15) is positioned directly above the positioner (1).

2. The robot servo motor according to claim 1, characterized in that said positioner (1) is configured with a plug-in terminal, and the plug-in terminal is matedly engaged with one end of the connecting wire (6).

3. The robot servo motor according to claim 1, characterized in that the input shaft of said multi-layer planetary transmission (13) is fixedly engaged with the output end of the motor (12), and the motor (12) is fixedly engaged in the interior of the top end of the connecting tube (7).

4. The robot servo motor according to claim 1, characterized in that the top end of said connecting tube (7) is configured with the multi-layer planetary transmission (13).

5. The robot servo motor according to claim 1, characterized in that the bottom end of said connecting tube (7) is fixedly engaged with the base (9) via the first fastening bolt (10), and the interior of the base (9) is configured with the circuit board (11).

6. The robot servo motor according to claim 1, characterized in that said circuit board (11) is matedly engaged with the other end of the connecting wire (6) and one of the energized wire (8) in the meanwhile.

7. The robot servo motor according to claim 1, characterized in that said circuit board (11) is positioned between the base (9) and the motor (12).

* * * * *